US011879850B2

(12) United States Patent
Wiederin et al.

(10) Patent No.: US 11,879,850 B2
(45) Date of Patent: Jan. 23, 2024

(54) ABRASIVE SAMPLING SYSTEM AND METHOD FOR REPRESENTATIVE, HOMOGENEOUS, AND PLANARIZED PREPARATION OF SOLID SAMPLES FOR LASER ABLATION

(71) Applicant: Elemental Scientific, Inc., Omaha, NE (US)

(72) Inventors: Daniel R. Wiederin, Omaha, NE (US); Ross Coenen, Omaha, NE (US); Mark Casper, Blair, NE (US)

(73) Assignee: Elemental Scientific, Inc., Omaha, NE (US)

( * ) Notice: Subject to any disclaimer, the term of this patent is extended or adjusted under 35 U.S.C. 154(b) by 267 days.

(21) Appl. No.: 17/381,939

(22) Filed: Jul. 21, 2021

(65) Prior Publication Data
US 2022/0026369 A1  Jan. 27, 2022

Related U.S. Application Data

(60) Provisional application No. 63/055,064, filed on Jul. 22, 2020.

(51) Int. Cl.
*G01J 3/44* (2006.01)
*G01N 21/71* (2006.01)
(Continued)

(52) U.S. Cl.
CPC ............ *G01N 21/718* (2013.01); *G01J 3/443* (2013.01); *H01J 49/105* (2013.01); *G01N 2201/06113* (2013.01)

(58) Field of Classification Search
CPC ....... G01N 21/718; G01N 2201/06113; G01N 2001/2866; G01N 1/286; G01J 3/443; H01J 49/105; H01J 49/0418
See application file for complete search history.

(56) References Cited

U.S. PATENT DOCUMENTS 5,681,217 A * 10/1997 Hoopman .............. B24D 11/00
 451/526
6,641,471 B1 * 11/2003 Pinheiro ................. B24B 37/04
 451/526
(Continued)

FOREIGN PATENT DOCUMENTS

JP  H0915170 A  1/1997
JP  2003344233 A  12/2003
(Continued)

OTHER PUBLICATIONS

PCT International Search Report and Written Opinion for PCT/US2021/042588, dated Nov. 4, 2021.

*Primary Examiner* — Abdullahi Nur
(74) *Attorney, Agent, or Firm* — Kevin E. West; Advent, LLP

(57) ABSTRACT

Systems and methods are described for providing a representative, homogeneous, and planarized target for solid sample laser ablation. A method embodiment includes, but is not limited to, removing portions of a solid sample with an abrasive sampling system, the abrasive sampling system including at least one of a plurality of abrasive particles configured to hold the portions of the solid sample on an abrasive substrate between the abrasive particles or a texturized surface configured to hold the portions of the solid sample on the texturized surface; transferring the abrasive sampling system holding the portions of the solid sample to a laser ablation system; and ablating the portions of the solid sample held by the abrasive sampling system with the laser ablation system.

19 Claims, 6 Drawing Sheets

(51) Int. Cl.
  *G01J 3/443* (2006.01)
  *H01J 49/10* (2006.01)

(56) References Cited

U.S. PATENT DOCUMENTS

| | | | | |
|---|---|---|---|---|
| 8,840,696 | B2* | 9/2014 | Kavanaugh | C09K 3/1409 |
| | | | | 51/297 |
| 11,247,295 | B1* | 2/2022 | Bol'shakov | G01N 21/718 |
| 2004/0235406 | A1* | 11/2004 | Duescher | B24D 11/001 |
| | | | | 51/300 |
| 2012/0099103 | A1* | 4/2012 | Hahn | G01N 21/718 |
| | | | | 356/316 |
| 2014/0273772 | A1* | 9/2014 | Chou | B24B 53/12 |
| | | | | 51/307 |
| 2015/0044951 | A1* | 2/2015 | Bajaj | B24B 37/245 |
| | | | | 451/526 |
| 2016/0042932 | A1* | 2/2016 | Hannigan | B23K 26/36 |
| | | | | 250/288 |
| 2018/0215975 | A1* | 8/2018 | Marazano | B01J 2/26 |
| 2019/0088549 | A1 | 3/2019 | Lei et al. | |

FOREIGN PATENT DOCUMENTS

| | | |
|---|---|---|
| JP | 2011079063 A | 4/2011 |
| KR | 20070037884 A | 4/2007 |

* cited by examiner

ABRASIVE SAMPLING SYSTEM AND METHOD FOR REPRESENTATIVE, HOMOGENEOUS, AND PLANARIZED PREPARATION OF SOLID SAMPLES FOR LASER ABLATION

CROSS-REFERENCE TO RELATED APPLICATIONS

The present application claims the benefit of 35 U.S.C. § 119(e) of U.S. Provisional Application Ser. No. 63/055,064, filed Jul. 22, 2020, and titled "ABRASIVE SAMPLING SYSTEM AND METHOD FOR REPRESENTATIVE, HOMOGENEOUS, AND PLANARIZED PREPARATION OF SOLID SAMPLES FOR LASER ABLATION." U.S. Provisional Application Ser. No. 63/055,064 is herein incorporated by reference in its entirety.

BACKGROUND

Laser Ablation Inductively Coupled Plasma Mass Spectrometry (LA-ICPMS) and Laser Ablation Inductively Coupled Plasma Optical Emission Spectrometry (LA-ICP-OES) techniques can be used to analyze the composition of a target, such as a solid or liquid target material. Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target, suspended within the carrier gas. Entrained within the flowing carrier gas, the target material is transported to an analysis system via a transport conduit to an inductively coupled plasma (ICP) torch where it is ionized.

A plasma containing the ionized particles and/or vapor is then analyzed by an analysis system, such as a mass spectrometry (MS), optical emission spectrometry (OES), isotope ratio mass spectrometry (IRMS), or electro-spray ionization (ESI) system. For example, ICP spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

SUMMARY

Systems and methods are described for providing a representative, homogeneous, and planarized target for solid sample laser ablation. A method embodiment includes, but is not limited to, removing portions of a solid sample with an abrasive sampling system, the abrasive sampling system including at least one of a plurality of abrasive particles configured to hold the portions of the solid sample on an abrasive substrate between the abrasive particles or a texturized surface configured to hold the portions of the solid sample on the texturized surface; transferring the abrasive sampling system holding the portions of the solid sample to a laser ablation system; and ablating the portions of the solid sample held by the abrasive sampling system with the laser ablation system.

A method embodiment includes, but is not limited to, directing a laser from a laser ablation system onto a blank abrasive sampling system, the blank abrasive sampling system including one or more of a plurality of abrasive particles configured to remove sample portions from a solid sample through physical contact or a texturized surface configured to remove sample portions from the solid sample through physical contact, the blank abrasive sampling system having no sample portions supported thereon; and analyzing a chemical composition of the blank abrasive sampling system via a sample analysis system and generating a signal corresponding to the chemical composition of the blank abrasive sampling system.

A system embodiment includes, but is not limited to, a sample support structure having a top surface and a bottom surface, the sample support structure including at least one structure projecting outward from the bottom surface; and an abrasive substrate coupled to the top surface of the sample support structure, the abrasive substrate including a plurality of abrasive particles configured to remove a portion of a solid sample and hold the portion of the solid sample on the abrasive substrate between the abrasive particles while coupled to the sample support structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Figure 1A:
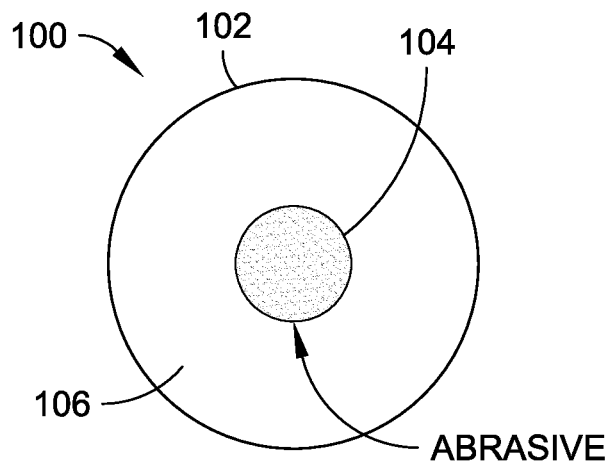
FIG. 1A is a diagrammatic illustration of an abrasive sampling system for preparing a representative, homogeneous, and planarized sample from a solid sample for laser ablation, in accordance with example implementations of the present disclosure.

Laser ablation is a sampling method which uses a focused beam of pulsed laser light to convert a portion of a solid or liquid sample from a target object into aerosol phase which is transported on a gas stream into an analyzer, such as an Inductively Coupled Plasma Mass Spectrometer (ICPMS). Multiple laser pulses may be used to ablate different areas of the sample to produce adequate signal and to ensure that a representative sample has been collected for analysis. Non-planar objects can provide challenges in providing samples for conventional sample cells used by laser ablation systems, such as by including surfaces that are not normal to the laser beam or otherwise not positioned to facilitate ablation (e.g., a portion of the surface is in an unfocused region of the laser beam), by including samples that may not physically fit within the confines of the sample cell, and the like.

Planarized objects can be desirable to easily focus the laser on the sample and raster to ablate a representative portion and generate analytical data. Planarization of a sample can be facilitated by methods such as by cutting and polishing a sample to make it flat, by grinding a sample, possibly mixing it with a binder, then pressing the ground portions into a flat disk, or by collecting sample on a filter paper (e.g., such as for liquid samples). However, such planarization techniques can involve drawbacks, such as by damaging the source of the material for the sample, by requiring a time-consuming preparation process, by providing a method that is difficult to protect a sample from contamination sources, and the like.

A target can be analyzed to determine a general composition representative of the target (e.g., compositional analysis) or to determine the composition of a subset region of the target (e.g., localized analysis). Compositional analysis of the target requires collection of a representative sample. Since the laser ablates only a small area of the sample at a time, collection of a representative sample may require that the laser be rastered for a long period of time over a large area. For example, the computational analysis can involve taking multiple samples from a target corresponding to different surface locations to generate an average composition of the target as a whole, can involve lengthy raster patterns to traverse the laser over a large area of the sample, or combinations thereof. Localized analysis of one or more particular regions of the target can involve ablation of samples at those particularized regions to analyze specific portions of the target.

For compositional analysis, the ablation process typically requires that the laser be focused on the surface of the sample so that the ablation process generates a proportionate amount of sample aerosol at different sampling locations. Further, the ablation process must sample a large enough area to account for sample inhomogeneity to ensure representative sampling. As sample inhomogeneity increases, the number of ablation points and time required for analysis must correspondingly increase to generate accurate data. This can lead to a reduction in throughput for laser ablation systems that are being utilized for compositional analysis, which can also increase the cost of operation of the laser ablation systems through increased system wear and tear, increased system operating gas usage, and the like.

Accordingly, in one aspect, the present disclosure is directed to a sample preparation method and system which can rapidly produce a representative, homogeneous, and planarized solid sample in a form which can be automatically positioned for subsequent laser ablation. The sample can be suitable for single location ablation to provide compositional analysis of the sample, which can facilitate high-throughput applications. The system can include a sample support structure having a substantially planar abrasive substrate mounted thereto or can include a texturized planar sample structure. In operation, the abrasive substrate is brought into contact with a sample and traversed over the surfaces of the sample desired for analysis. The abrasive substrate can be removably attached to a handheld holder or tool to facilitate sample collection and to apply consistent pressure during sampling. The abrasive substrate removes portions of the sample and holds the portions on the substrate between the abrasive portions and can be mounted to or later applied to a sample support structure. In implementations, a coating material is sprayed onto the abrasive substrate to fix the sample particles to the abrasive substrate.

The sample support structure holding the abrasive substrate can be placed into position adjacent to or within the sample cell of the laser ablation system to make the sample held by the abrasive substrate available to the laser for ablation. Alternatively, the abrasive substrate can be directly introduced to the sample cell without additional support structure. In implementations, a sample support structure holding a blank abrasive substrate (e.g., no sample held by the abrasive substrate) is introduced to the sample cell of the laser ablation system, where the laser is directed onto the blank abrasive substrate to account for analyzer conditions (e.g., ICPMS matrix effects or blank contaminants) without a sample present on the abrasive substrate. A plurality of sample support structures having abrasive substrates mounted thereto can be stored in one or more vertically-stacked arrangements while maintaining physical separation between the abrasive substrates and the adjacent sample support structure (e.g., to avoid potential contamination or loss of sample). A robotic arm can remove one of the sample support structures (e.g., a top structure of the vertically-stacked arrangement, a bottom structure of the vertically-stacked arrangement, etc.) for introduction to the sample cell of the laser ablation system.

Example Implementations

Referring generally to FIGS. 1A through 5C, systems 100 are shown for preparing a representative, homogeneous, and planarized sample from a solid sample for laser ablation.

Figure 1B:
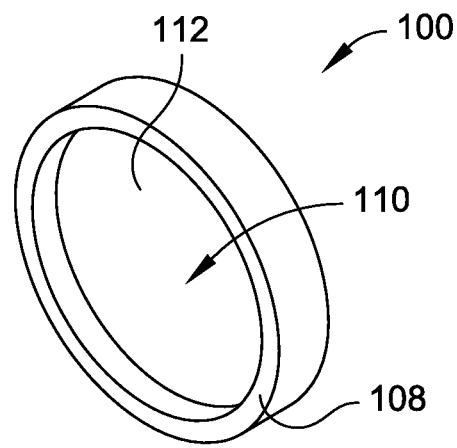
FIG. 1B is a diagrammatic illustration of a bottom portion of the abrasive sampling system of FIG. 1A.
Figure 1C:
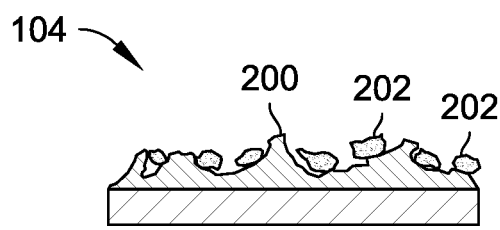
FIG. 1C is a diagrammatic illustration of a cross section of an abrasive sampling system with sample particles held thereon following a sampling procedure, in accordance with example implementations of the present disclosure.

The system 100 generally includes a sample support structure 102 having an abrasive substrate 104 mounted to a top surface 106 of the sample support structure 102. The abrasive substrate 104 can be brought into contact with a sample and traversed over the surfaces of the sample desired for laser ablation, where the portions of the sample are held on the substrate between the abrasive portions while optionally being mounted to or later applied to the sample support structure 102. The abrasive substrate 104 can include a textured substrate material (e.g., a portion of the sample support structure 102 being texturized), an abrasive material fixed to the abrasive substrate 104, such as through an adhesive, or combinations thereof. In implementations, the abrasive substrate 104 can include abrasive particles fixed to a base formed from a plastic material, a paper material, a composite material, a metallic material, a sticker (e.g., an adhesive on a paper or plastic substrate), or combinations. In implementations, the abrasive substrate 104 includes a plurality of ceramic particles (e.g., silicon carbide abrasive particles), diamond particles, or other abrasive material(s) fixed on a planar substrate material via an adhesive material. For example, FIG. 1C shows the abrasive substrate 104 with an abrasive surface 200 (e.g., formed from a textured substrate material, from abrasive material fixed to a substrate, etc.) following a sampling process where the abrasive substrate 104 was brought into contact with surfaces of the sample to obtain sample portions 202 (e.g., particulate, powder, etc.) and hold the sample portions 202 on the abrasive surface 200 (e.g., between surface features).

Figure 1D:
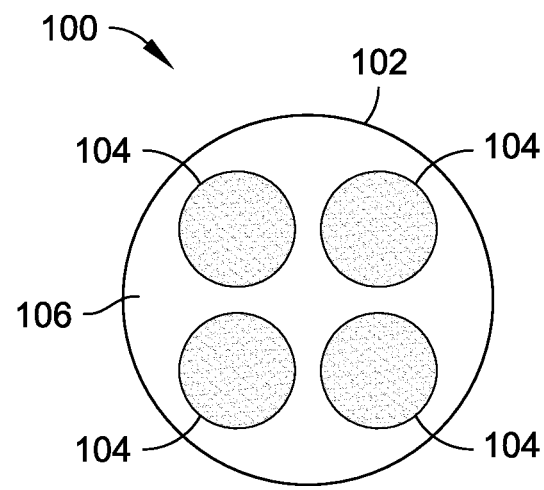
FIG. 1D is a diagrammatic illustration of an abrasive sampling system having a sample substrate supporting multiple abrasive portions, in accordance with example implementations of the present disclosure.

The abrasive substrate 104 can be formed in any planar shape, including but not limited to, circular, rectangular, triangular, irregular, etc., to provide a planar sample surface to focus the laser of a laser ablation system on the sample supported by the abrasive substrate 104 within or adjacent to the sample cell of the laser ablation system. For instance, the abrasive substrate 104 can be directly introduced to the sample cell or can be supported by the sample support structure 102 within the sample cell. In implementations, a single sample support structure 102 can hold multiple abrasive substrates 104, such as providing multiple samples on a single sample support structure (e.g., duplicate samples, different samples from different locations on the source solid sample, etc.). An example sample support structure holding multiple abrasive substrates 104 is shown in FIG. 1D. In implementations, the abrasive substrate 104 can have a planar profile with a diameter from about 1 mm to about 250 mm with abrasive material having a particle size or with texturized surface features to provide a grit profile from about 120 to about 5000 grit, however the instant disclosure is not limited to such abrasive particle sizes or texturized surface features and can include sizes greater than 120 grit or smaller than 5000 grit depending on the surface properties of the solid sample to be analyzed.

Figure 2A:
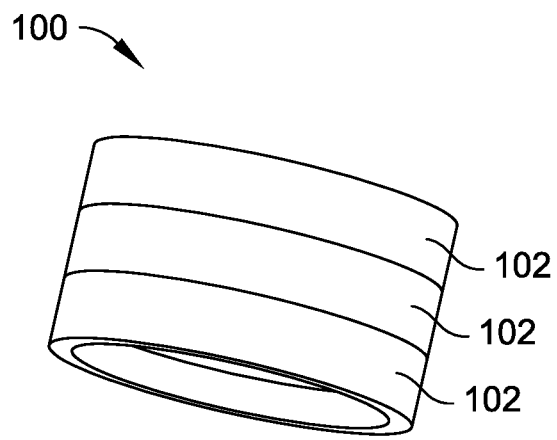
FIG. 2A is a diagrammatic illustration of an abrasive sampling system having a plurality of sample support structures having abrasive substrates mounted thereto in a vertically-stacked arrangement.
Figure 2B:
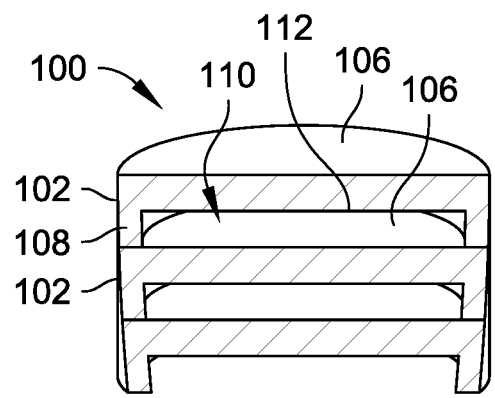
FIG. 2B is a cross-sectional view of the abrasive sampling system of FIG. 2A.
Figure 3A:
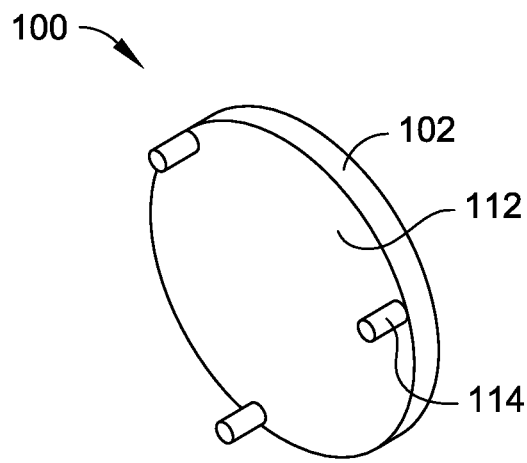
FIG. 3A is a diagrammatic illustration of an abrasive sampling system in accordance with example implementations of the present disclosure.
Figure 3B:
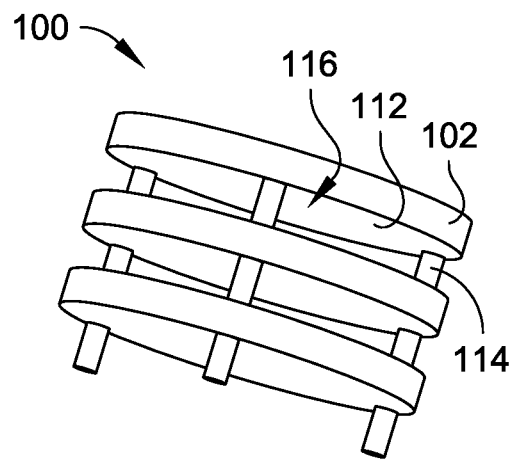
FIG. 3B is a diagrammatic illustration of an abrasive sampling system having a plurality of sample support structures of FIG. 3A having abrasive substrates mounted thereto in a vertically-stacked arrangement.

The system 100 can facilitate stacking of multiple sample support structures 102 to store multiple samples in a configuration to be positioned by an automatic sample handler of the laser ablation system while maintaining physical separation of the abrasive substrate 104 of one sample support structure 102 from the structure of a stacked sample support structure 102. Referring to FIG. 1B, the sample support structure 102 is shown having a rim 108 defining an aperture 110 adjacent a bottom surface 112 of the sample support structure 102 opposite the top surface 106. The rim 108 of one sample support structure 102 can rest on the top surface 106 of another sample support structure 102 to provide a vertically-stacked arrangement of sample support structures 102. The vertically-stacked arrangement can provide a cavity over the bottom sample support structure 102 via the positioning of the aperture 110 into which the abrasive substrate 104 can be positioned without contact with the top sample support structure 102, as shown in FIGS. 2A and 2B. In another example shown in FIG. 3A, the sample support structure 102 can include a plurality of pins 114 projecting outward from the bottom surface 112. The pins 114 can be included in addition to or in the absence of the rim 108. As the sample support structures 102 are vertically stacked, the pins 114 of one sample support structure 102 rest on the top surface 106 of another sample support structure 102 to define a gap 116 between respective sample support structure 102 into which the abrasive substrate 104 can be positioned without contact with the top sample support structure 102, as shown in FIG. 3B. In implementations, the laser ablation system can include a positioning system that incorporates a robotic arm having a vacuum attachment or other structure to draw a sample support structure 102 from the top of the vertical stack of sample support structures 102 and position the drawn sample support structure 102 in proximity of the laser of the laser ablation system.

In implementations, the sample support structure 102 can include a sample identifier to identify characteristics of the sample(s) held on the abrasive substrate 104. The sample identifier can include, but is not limited to, a barcode, a data matrix two-dimensional (2D) barcode, an RFID tag, an alpha-numeric label, or other identifier that is associated with the sample(s) held on the abrasive substrate 104 in a computer system. For example, the sample identifier can be affixed to the bottom surface 112 or other another area to provide access to the sample identifier by an optical scanner or other identification device to scan the sample identifier and access data related to the sample via the computer system. The sample identifier can be associated with information such as an identification of the source object for the sample, a time of sampling, a date of sampling, a type of sample, a sample analysis protocol to be used when analyzing the sample (e.g., laser ablation conditions, ICP instrument conditions, chemical elements to be analyzed, etc.), and the like.

Figure 4A:
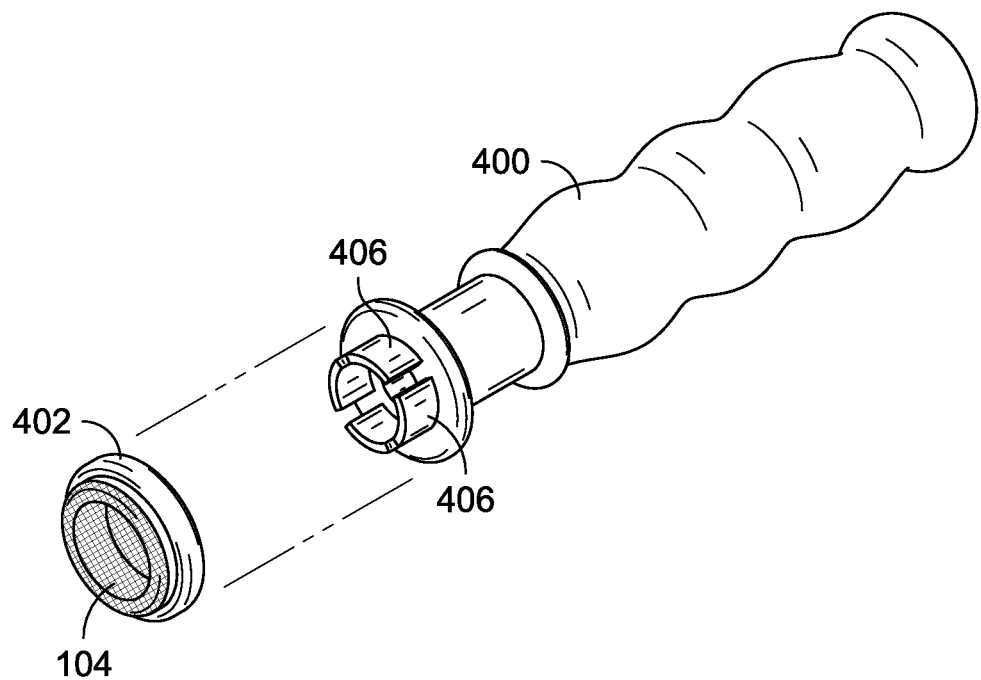
FIG. 4A is a diagrammatic illustration of a front isometric view of an abrasive sampling system having a handheld tool to secure a sample support structure during sampling of a solid sample target for laser ablation, in accordance with example implementations of the present disclosure.
Figure 4B:
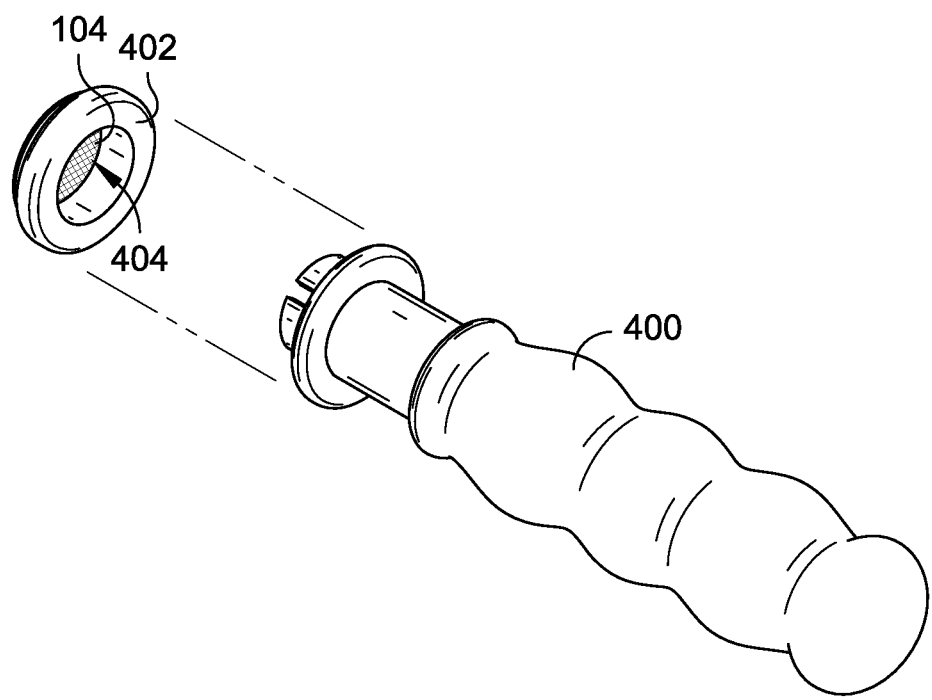
FIG. 4B is a diagrammatic illustration of a rear isometric view of the abrasive sampling system of FIG. 4B, showing an end of the handheld tool and a bottom portion of the sample support structure into which the end of the handheld tool secures the sample support structure.

Referring to FIGS. 4A and 4B, the system 100 can include a handheld tool 400 to secure the abrasive substrate 104 during sampling of a solid sample target for laser ablation. The abrasive substrate 104 can be secured to the sample support structure 102 on the tool 400 during sampling or the abrasive substrate 104 can be supported on the tool 400 by a different structure 402 to be subsequently secured to the sample support structure 102 following abrasion of the sample. The tool 400 can removeably secure the abrasive substrate 104 to facilitate the application of consistent pressure during traversal of the abrasive substrate 104 over the surface(s) of the object to be sampled. For example, the abrasive substrate 104 can rest on an upper surface of the structure 402 with the structure defining an aperture 404 into which one or more flanges 406 of the tool 400 are inserted and held in place (e.g., via friction fit). Alternatively or additionally, the system 100 can include a motorized tool to rotate the abrasive substrate 104 during sample collection. For example, the structure 402 or the sample support structure 102 can be supported on a tool end of a rotary drill or other motorized device to rotate the abrasive substrate 104 for application of the abrasive substrate 104 against the surface(s) to be sampled.

In implementations, the sample support structure 102 can support a plurality of samples to be analyzed by the laser ablation system. For example, the sample support structure 102 can support a plurality of abrasive structures 104 (e.g., a plurality of abrasive structures 104 having a width from about 1 mm to about 10 mm) positioned on the surface 106. Each of the plurality of abrasive structures 104 can be used to obtain samples from different objects, from different regions of the same object, or from similar regions of the same object (e.g., for replicate analysis). Alternatively or additionally, different sections of a single abrasive structure 104 can be used to obtain samples from multiple different objects, from different regions of the same object, or from similar regions of the same object (e.g., for replicate analysis). The laser ablation system can be configured to target the individual abrasive structures 104 or individual sections of different samples (e.g., in a serial manner) to analyze a plurality of samples from a single sample support structure 102 or from a single abrasive structure 104 if no sample support structure 102 is utilized.

The system 100 can include a coating to secure one or more samples held on the abrasive substrate 104. For example, an adhesive coating can be sprayed onto the abrasive substrate 104 prior to and/or subsequent to interaction between the abrasive substrate 104 and the object to be sampled to trap sample particles onto the abrasive substrate 104. Alternatively or additionally, the adhesive coating can be applied to the sample support structure 102 prior to and/or subsequent to attachment of the abrasive substrate 104 to the top surface 106 of the sample support structure 102. The coating can secure the sample on the abrasive substrate 104 during storage and transport of the sample between a sample source site (e.g., a location of the object to be sampled) and a laboratory site, from a storage site to the laser ablation system, or the like. For example, the coating can prevent loss of sample from the abrasive substrate 104 due to air currents, the coating can prevent oxidation or contamination of the sample during transport and storage, and the like. Alternatively or additionally to a coating, the system 100 can include a holder configured to couple to or enclose at least a portion of the abrasive substrate 104 to isolate the abrasive substrate 104 from the external environment of the system 100, such as to prevent loss or contamination of the sample held on the abrasive substrate 104 during storage and transport of the sample between a testing site and a laboratory site, from a storage site to the laser ablation system, or the like.

The system 100 can account for the composition of the abrasive substrate 104 during the processing of samples by the laser ablation system and subsequent processing of the samples by the analytical system coordinated with the laser ablation system. For example, the laser ablation system can first target the laser onto a blank abrasive substrate 104 (e.g., an abrasive structure having no sample located thereon, a location on an abrasive substrate 104 with no local sample but with sample on another location of the abrasive substrate 104, etc.) to account for effects of the abrasive substrate 104 on analyzer conditions (e.g., blank contaminants, ICPMS matrix effects, etc.). The system 100 can then use the laser ablation system to target the sample on the abrasive substrate 104 for sample analysis. The signal generated by the analytical system corresponding to the content of the blank abrasive substrate 104 can be subtracted from the signal corresponding to the content of the sample on the abrasive substrate 104 to provide a signal corresponding to the content of the sample alone (e.g., without the effects of the abrasive sampling system present). In analyses where the system 100 utilizes a coating on the abrasive substrate 104 and/or the sample support structure 102, a blank abrasive substrate 104 with coating applied thereto (e.g., no sample between the abrasive substrate 104 and the coating) can be targeted by the laser ablation system to account for contamination effects of the coating and abrasive substrate 104 on measurements attributed to a sample. The analytical system used to analyze the composition of ablated sample from the laser ablation system can include, but is not limited to, ICP emission spectroscopy, ICPMS, optical spectroscopy, laser-induced breakdown spectroscopy (LIBS), infrared (IR) spectrometry, and combinations thereof.

Experimentation Example—Metals Analysis

In an implementation, the system 100 was utilized to perform analyses of an unknown metal composition and known metal alloys via laser ablation inductively coupled plasma mass spectrometry to compare the results of the unknown metal composition to the results of the known metal alloys to quickly and easily identify which alloy is the best match for the unknown metal composition. The unknown sample and the known alloys were each sampled by the abrasive substrate 104 to provide a representative, homogenized, and planar sample for each material from the respective solid samples. The metal alloys included 303 stainless steel, 304 stainless steel, and 316 stainless steel. The 303 stainless steel and 304 stainless steel alloys are known to contain about 18% by weight chromium and about 8% by weight nickel, whereas 316 stainless steel alloys are known to contain about 16% by weight chromium, about 8% by weight nickel, and about 2% by weight molybdenum. The addition of molybdenum causes 316 stainless steel to be generally more heat and corrosion resistant as compared to the 303 and 304 stainless steel alloys.

Figure 5A:
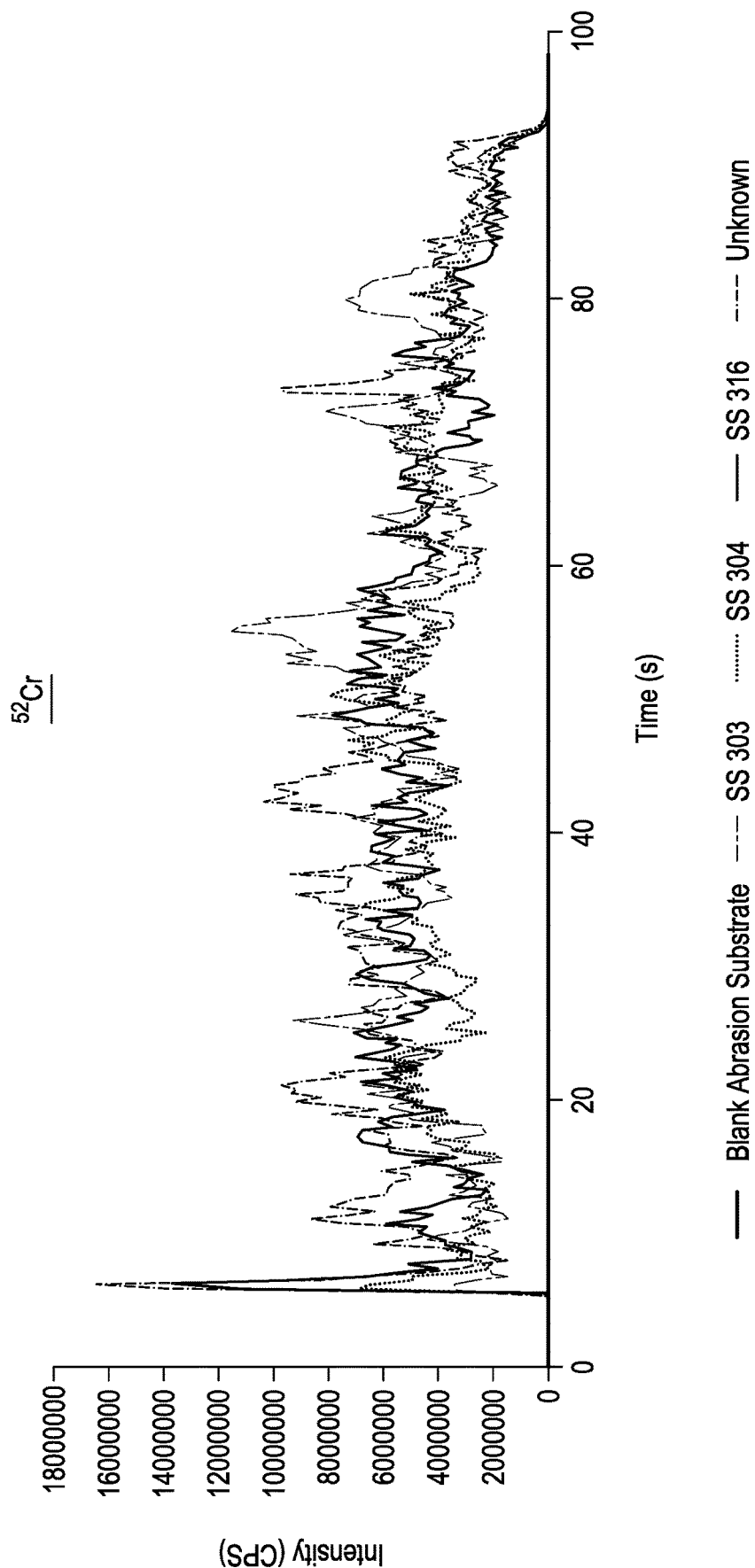
FIG. 5A is a graph of intensity over time for chromium content measured by ICP spectrometry for a gas blank, a blank abrasion substrate, three known steel samples, and an unknown metal composition sample.
Figure 5B:
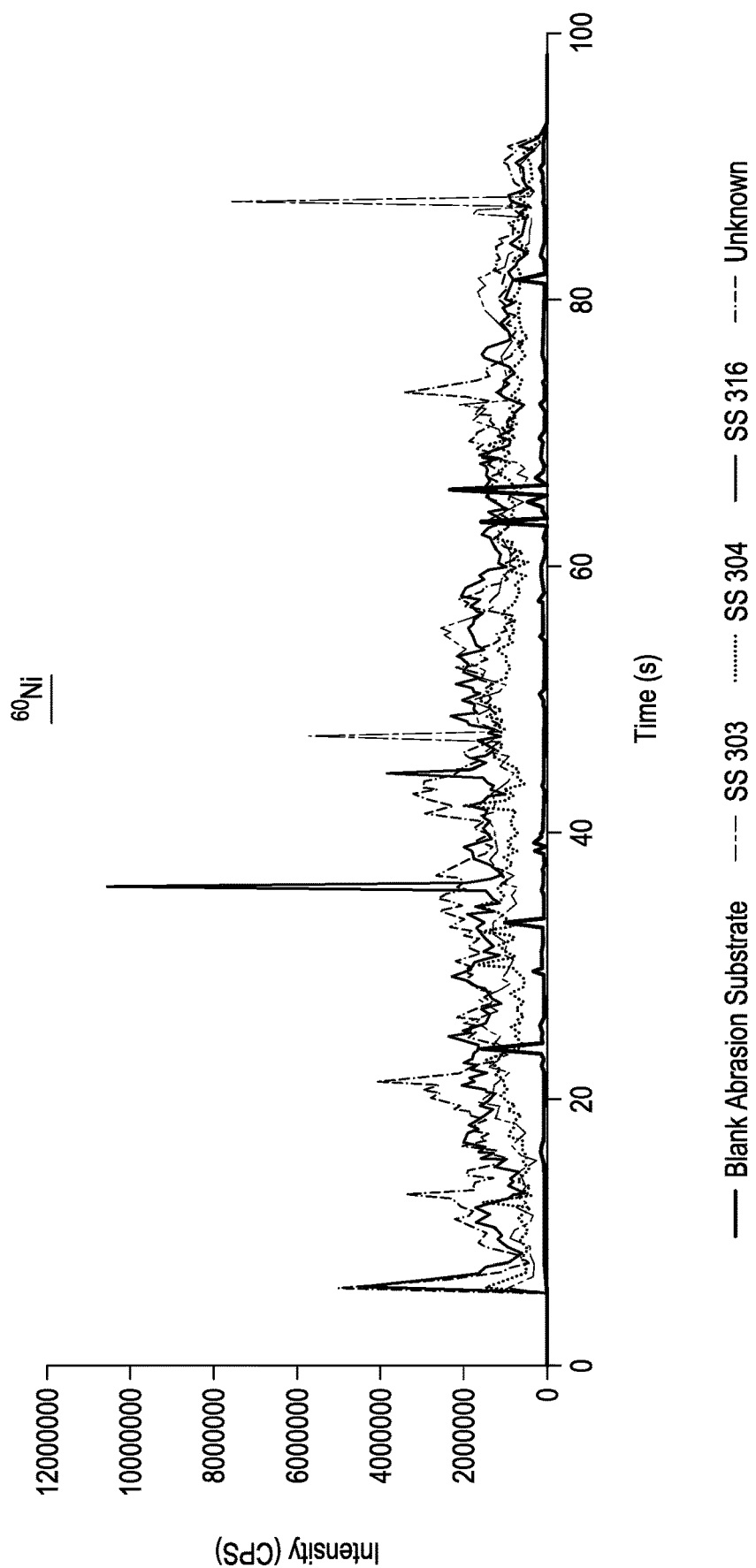
FIG. 5B is a graph of intensity over time for nickel content measured by ICP spectrometry in the blanks and samples from FIG. 5A.
Figure 5C:
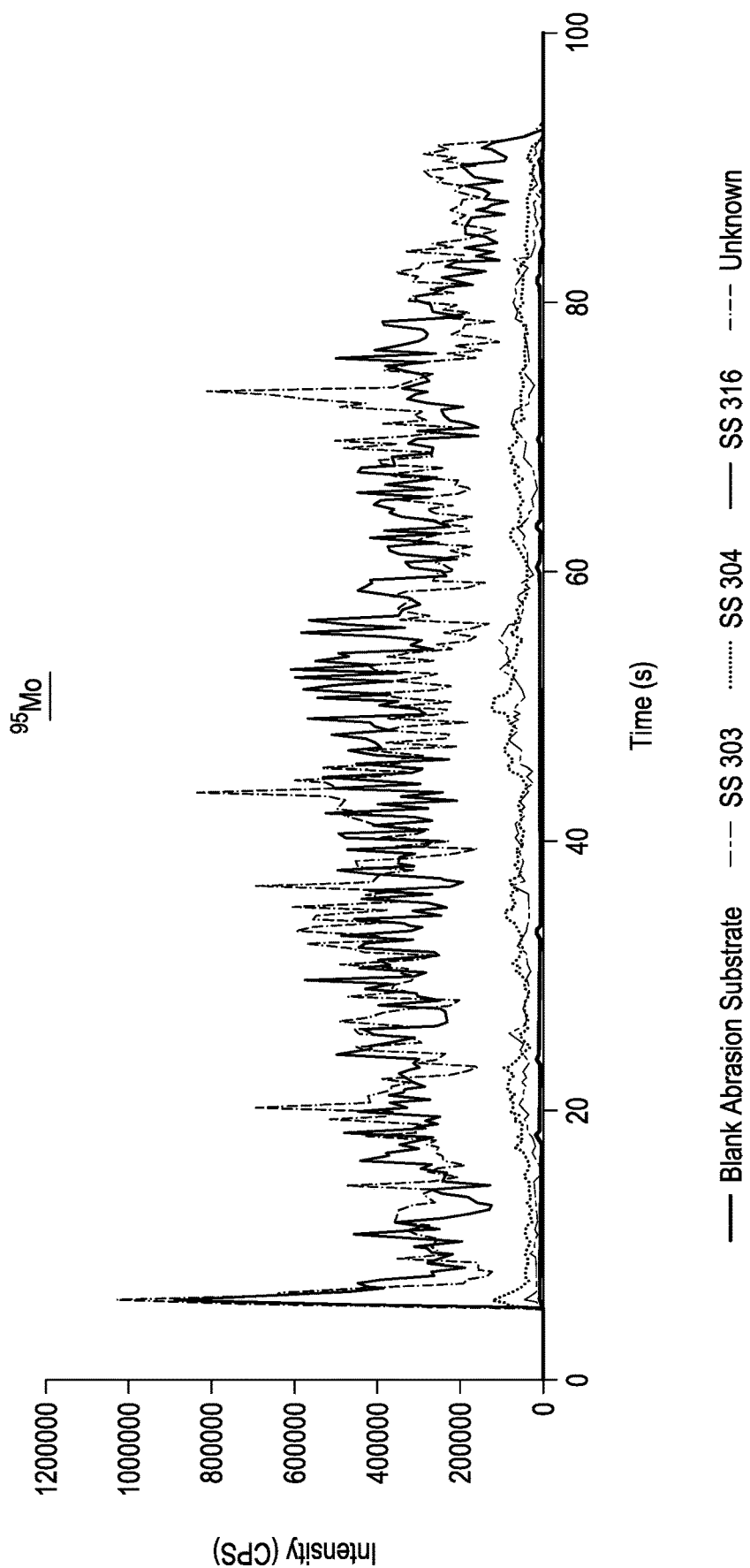
FIG. 5C is a graph of intensity over time for molybdenum content measured by ICP spectrometry in the blanks and samples from FIG. 5A.

The abrasion-collected samples from the unknown metal composition and the known metal alloys were abraded onto individual abrasive structures 104 and fixed onto individual sample support structures 102. Laser ablation inductively coupled plasma mass spectrometry was used to analyze the composition of the abrasion-collected samples from the unknown metal composition and the known metal alloys and of a blank abrasive substrate 104. Gas blanks, with no ablation target, were measured at the beginning and at the end of the experiment and provided insignificant background intensity in all measurements. Analysis results are shown in FIGS. 5A through 5C. The presence of molybdenum in the unknown metal composition and the 316 stainless steel and the lack thereof in the other samples provided an indication that the unknown metal composition was likely composed of a 316 stainless steel alloy.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A method for preparing a representative, homogeneous, and planarized sample from a solid sample for laser ablation, the method comprising:
   removing portions of a solid sample with an abrasive sampling system, the abrasive sampling system including at least one of a plurality of abrasive particles configured to hold the portions of the solid sample on an abrasive substrate between the abrasive particles or a texturized surface configured to hold the portions of the solid sample on the texturized surface;

transferring the abrasive sampling system holding the portions of the solid sample to a laser ablation system; and ablating the portions of the solid sample held by the abrasive sampling system with the laser ablation system.

2. The method of claim 1, further comprising:

ablating a blank abrasive sampling system with the laser ablation system to provide a blank sample, the blank abrasive sampling system having no portions of the solid sample thereon; and analyzing the content of the blank sample via a sample analysis system.

3. The method of claim 1, further comprising:

analyzing the content of the portions of the solid sample following ablation via one or more of inductively coupled plasma emission spectrometry, inductively coupled plasma mass spectrometry, optical spectroscopy, laser-induced breakdown spectroscopy, and infrared spectrometry.

4. The method of claim 3, further comprising:

generating a signal corresponding to the content of the portions of the solid sample.

5. The method of claim 4, further comprising:

ablating a blank abrasive sampling system with the laser ablation system to provide a blank sample, the blank abrasive sampling system having no portions of the solid sample thereon;

analyzing the content of the blank sample; and generating a signal corresponding to the content of the blank sample.

6. The method of claim 5, further comprising:

subtracting the signal corresponding to the content of the blank sample from the signal corresponding to the content of the portions of the solid sample.

7. The method of claim 1, wherein the abrasive sampling system includes the plurality of abrasive particles coupled to the abrasive substrate.

8. The method of claim 7, further comprising mounting the abrasive substrate to a sample support structure; and transferring the sample support structure to the laser ablation system.

9. The method of claim 8, further comprising:

ablating a blank abrasive sampling system coupled to the sample support structure to provide a blank sample, the blank abrasive sampling system having no portions of the solid sample between the abrasive particles; and analyzing the content of the blank sample.

10. The method of claim 1, wherein transferring the abrasive sampling system holding the portions of the solid sample to a laser ablation system and ablating the portions of the solid sample held by the abrasive sampling system with the laser ablation system include:

transferring the abrasive sampling system holding the portions of the solid sample to a laser ablation system with an automated handling system and ablating the portions of the solid sample held by the abrasive sampling system under automated analysis.

11. The method of claim 1, further comprising:

introducing an adhesive to affix the portions of the solid sample on the abrasive sampling system.

12. The method of claim 11, wherein introducing an adhesive to affix the portions of the solid sample on the abrasive sampling system includes introducing the adhesive to affix the portions of the solid sample on the abrasive sampling system prior to transferring the abrasive sampling system holding the portions of the solid sample to the laser ablation system.

13. A method for preparing a representative, homogeneous, and planarized sample from a solid sample for laser ablation, the method comprising:

directing a laser from a laser ablation system onto a blank abrasive sampling system, the blank abrasive sampling system including one or more of a plurality of abrasive particles configured to remove sample portions from a solid sample through physical contact or a texturized surface configured to remove sample portions from the solid sample through physical contact, the blank abrasive sampling system having no sample portions supported thereon; and analyzing a chemical composition of the blank abrasive sampling system via a sample analysis system coordinated with the laser ablation system and generating a signal corresponding to the chemical composition of the blank abrasive sampling system via the sample analysis system.

14. The method of claim 13, further comprising:

directing the laser from the laser ablation system onto an abrasive sampling system having sample portions from the solid sample supported thereon; and analyzing a chemical composition of the sample portions supported on the abrasive sampling system via the sample analysis system and generating a signal corresponding to the chemical composition of the sample portions supported on the abrasive sampling system.

15. The method of claim 14, further comprising:

subtracting the signal corresponding to the chemical composition of the blank abrasive sampling system from the signal corresponding to the chemical composition of the sample portions supported on the abrasive sampling system.

16. The method of claim 14, further comprising removing the sample portions from the solid sample through physical contact between the solid sample and the abrasive sampling system.

17. The method of claim 16, further comprising introducing an adhesive to affix the sample portions supported on the abrasive sampling system.

18. The method of claim 17, further comprising introducing the adhesive to the blank abrasive sampling system prior to analyzing the chemical composition of the blank abrasive sampling system via the sample analysis system.

19. The method of claim 13, wherein the sample analysis system operates according to at least one of inductively coupled plasma emission spectrometry, inductively coupled plasma mass spectrometry, optical spectroscopy, laser-induced breakdown spectroscopy, and infrared spectrometry.

* * * * *